(12) United States Patent
Krupenkin et al.

(10) Patent No.: US 9,259,047 B2
(45) Date of Patent: *Feb. 16, 2016

(54) APPARATUS FOR FOOTWEAR-EMBEDDED MECHANICAL ENERGY HARVESTING SYSTEM BASED ON DUAL-LOOP CHANNEL

(71) Applicants: Thomas Nikita Krupenkin, Madison, WI (US); Joseph Ashley Taylor, Madison, WI (US)

(72) Inventors: Thomas Nikita Krupenkin, Madison, WI (US); Joseph Ashley Taylor, Madison, WI (US)

(*) Notice: Subject to any disclaimer, the term of this patent is extended or adjusted under 35 U.S.C. 154(b) by 29 days.

This patent is subject to a terminal disclaimer.

(21) Appl. No.: 14/023,752

(22) Filed: Sep. 11, 2013

(65) Prior Publication Data
US 2014/0068973 A1 Mar. 13, 2014

Related U.S. Application Data

(60) Provisional application No. 61/700,359, filed on Sep. 13, 2012.

(51) Int. Cl.
| F02B 63/04 | (2006.01) |
| A43B 3/00 | (2006.01) |
| H02N 1/08 | (2006.01) |
| A43B 13/20 | (2006.01) |
| H02N 11/00 | (2006.01) |

(52) U.S. Cl.
CPC .............. *A43B 3/0015* (2013.01); *A43B 13/203* (2013.01); *A43B 13/206* (2013.01); *H02N 1/08* (2013.01); *H02N 11/002* (2013.01)

(58) Field of Classification Search
CPC .............................. H02N 11/002; H02N 99/00
USPC .......... 290/1 R; 310/11, 12.12; 417/410.1, 92; 36/1, 2.6, 137
See application file for complete search history.

(56) References Cited

U.S. PATENT DOCUMENTS

| 3,927,329 | A | * | 12/1975 | Fawcett et al. ................. 290/1 R |
| 5,298,818 | A | * | 3/1994 | Tada ................................. 310/11 |
| 6,182,378 | B1 | * | 2/2001 | Sendaula .......................... 36/29 |
| 6,239,501 | B1 | * | 5/2001 | Komarechka .................. 290/1 R |
| 6,865,825 | B2 | * | 3/2005 | Bailey et al. ...................... 36/88 |
| 7,105,935 | B2 | * | 9/2006 | Hsu .................................... 290/2 |
| 7,107,706 | B1 | * | 9/2006 | Bailey et al. ...................... 36/88 |
| 7,467,928 | B2 | | 12/2008 | Fakunle et al. |
| 7,898,096 | B1 | * | 3/2011 | Krupenkin .................... 290/1 R |
| 7,989,197 | B2 | | 8/2011 | Yoo et al. |
| 8,053,914 | B1 | | 11/2011 | Krupenkin |
| 8,258,644 | B2 | | 9/2012 | Kaplan |
| 2007/0284552 | A1 | * | 12/2007 | Khorshid ................. 251/129.04 |
| 2008/0009043 | A1 | | 1/2008 | Yoo et al. |

(Continued)

FOREIGN PATENT DOCUMENTS

JP 2008-184957 8/2008

*Primary Examiner* — Julio C. Gonzalez Ramirez
*Assistant Examiner* — Julio Gonzalez
(74) *Attorney, Agent, or Firm* — Wendy W. Koba (57) ABSTRACT

An energy harvesting apparatus is described that utilizes hydraulic actuation and creates a continuous, revolving motion of a chain of energy-producing elements within an energy-producing channel (the channel being in the form of a tube, for example). In particular, the arrangement of the present invention is based upon a specially-designed dual-loop channel topology that allows for efficient conversion of a unidirectional flow of a fluid entering the energy-producing channel into a smooth, continuous revolving motion of a chain of energy-producing elements within the channel.

8 Claims, 13 Drawing Sheets

(56) References Cited

U.S. PATENT DOCUMENTS

| | | | |
|---|---|---|---|
| 2008/0127510 A1* | 6/2008 | Yang | 36/29 |
| 2009/0283407 A1 | 11/2009 | Shah et al. | |
| 2011/0008767 A1 | 1/2011 | Durack | |
| 2011/0095648 A1 | 4/2011 | Zhang | |
| 2011/0204653 A1* | 8/2011 | Liu et al. | 290/1 R |
| 2011/0315183 A1 | 12/2011 | Henness | |
| 2012/0091004 A1 | 4/2012 | Abell et al. | |
| 2012/0292915 A1 | 11/2012 | Moon | |
| 2012/0325227 A1* | 12/2012 | Robinson et al. | 131/328 |
| 2014/0182163 A1* | 7/2014 | Krupenkin et al. | 36/2.6 |

* cited by examiner

APPARATUS FOR FOOTWEAR-EMBEDDED MECHANICAL ENERGY HARVESTING SYSTEM BASED ON DUAL-LOOP CHANNEL

CROSS-REFERENCE TO RELATED APPLICATIONS

This application claims the benefit of U.S. Provisional Application No. 61/700,359 filed on Sep. 13, 2012, and herein incorporated by reference.

BACKGROUND OF THE INVENTION

Currently, the majority of autonomous and mobile electronic systems are powered by electrochemical batteries. Although battery quality has substantially improved over the last two decades, their energy density has not greatly increased. At the present time, however, factors such as cost, weight, limited service time and waste disposable problems (all intrinsic to electrochemical batteries) are impeding the advance of many areas of electronics. The problem is especially acute in the portable electronics space, where rapidly growing performance and sophistication of mobile electronic devices lead to ever-increasing power demands that electrochemical batteries are unable to meet.

One of the technologies that holds great promise to substantially alleviate the current reliance on electrochemical batteries is high-power energy harvesting. The concept of energy harvesting works towards developing self-powered devices that do not require replaceable power supplies. In cases where high mobility and high-power output is required, harvesters that convert mechanical energy into electrical energy are particularly promising as they can tap into a variety of high-power-density energy sources, including human locomotion.

High-power harvesting of mechanical energy is a long-recognized concept which has not been commercialized in the past due to the lack of a viable energy harvesting technology. Traditional methods of mechanical-to-electrical energy conversion such as electromagnetic, piezoelectric, or electrostatic do not allow effective direct coupling to the majority of high-power environmental mechanical energy sources. Bulky and expensive mechanical or hydraulic transducers are often required to convert a broad range of aperiodic forces and displacements typically encountered in nature into a form that is accessible for conversion using those methods.

Recently a new approach to energy harvesting using microfluidic devices that substantially alleviates the above-mentioned problems has been proposed. In particular, a high-power microfluidics-based energy harvester is disclosed in U.S. Pat. No. 7,898,096, entitled METHOD AND APPARATUS FOR ENERGY HARVESTING USING MICROFLUIDICS, inventor: Thomas Nikita Krupenkin, granted Mar. 1, 2011, and in U.S. Pat. No. 8,053,914, entitled METHOD AND APPARATUS FOR ENERGY HARVESTING USING MICROFLUIDICS, inventor: Thomas Nikita Krupenkin, granted Nov. 8, 2011, both of which are incorporated by reference herein in their entirety. The disclosed Krupenkin energy harvester generates electrical energy through the interaction of thousands of microscopic liquid droplets with a network of thin-film electrodes and is capable of providing several watts of power. In one preferred embodiment of this technique, a train of energy-producing droplets is located in a thin channel and is hydraulically actuated by applying a pressure differential between the ends of the channel. Such an energy generation method provides an important advantage as it allows efficient direct coupling with a wide range of high-power environmental mechanical energy sources including human locomotion.

A new method for energy harvesting using microfluidic devices that improves on the teaching of the above-cited Krupenkin patents has also been under development by the inventors and provides a new energy generation method and an apparatus that combine, in a synergistic way, the microfluidic-based electrical energy generation method described in these patents with the classical magnetic method of electrical power generation based on Faraday's law of electromagnetic induction. The resulting approach has a number of substantial advantages over the teaching of these Krupenkin patents, since it allows for effective energy generation without the need for an external bias voltage source. This improves the reliability and simplifies the harvester design in comparison with the teaching of U.S. Pat. Nos. 7,898,096 and 8,053,914.

However, the energy generation methods disclosed in these various references are not free from some shortcomings. In particular, no provision is made in any of these disclosures for allowing a continuous revolving motion of a chain of energy-producing elements within an energy-producing channel. The revolving motion of an energy-producing chain has a number of important advantages over the other types of motion of the chain, such as reciprocating motion. In particular, the revolving motion of an energy-producing chain allows the use of energy-producing chains and channels with substantially shorter lengths, thus enabling a more compact design of the harvester device. Another advantage of utilizing revolving chain motion is the ability to sustain a smooth, continuous motion by inertia for some time after the hydraulic actuation of the chain stops. This sustained motion extends the power generation time, and thus leads to a better energy harvesting efficiency.

Therefore, a method and an apparatus that can provide continuous revolving motion of a chain of energy-producing elements within an energy-producing channel would be highly beneficial, as it would improve the energy harvester device design and increase its efficiency.

SUMMARY OF THE INVENTION

The needs remaining in the prior art are addressed by the present invention, which discloses a new energy harvesting apparatus that utilizes hydraulic actuation and creates a continuous, revolving motion of a chain of energy-producing elements within an energy-producing channel. In particular, the arrangement of the present invention is based upon a specially-designed dual-loop channel topology that allows for efficient conversion of a unidirectional flow of a fluid entering the energy-producing channel into a smooth, continuous revolving motion of a chain of energy-producing elements within the channel.

In one embodiment, the present invention discloses an apparatus for converting mechanical energy into electrical energy utilizing an energy-producing chain passing within an energy-producing channel, the apparatus comprising a dual-loop channel formed as a tube, each loop including an inlet port and an outlet port for allowing the passage of an inert fluid, a plurality of energy-producing elements surrounding at least a portion of the dual-loop channel, a chain of energy-producing elements disposed within the dual-loop channel and a pair of flexible chambers (each chamber filled with an inert fluid) coupled between the inlet port and the outlet port of each loop of the dual-loop channel, the movement of the inert fluid being hydraulically activated in a controlled manner such that the chain of energy-producing elements moves in a continuous, revolving motion along the dual-loop chain in response to a mechanical compression of a flexible chamber.

In one specific embodiment, a magnetically-actuated valve is used in combination with a magnetic component added to a front end of an energy-producing chain to control the movement of the inert liquid within the dual-loop channel in a manner such that the energy-producing chain moves in a continuous, revolving motion within the energy-producing channel.

Other and further aspects and advantages of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Prior to describing the particulars associated with a dual-loop channel topology for providing continuous motion of an energy-producing chain within an energy-producing channel, a basic overview of an exemplary energy harvesting mechanism based on human locomotion will be provided.

Figure 1:
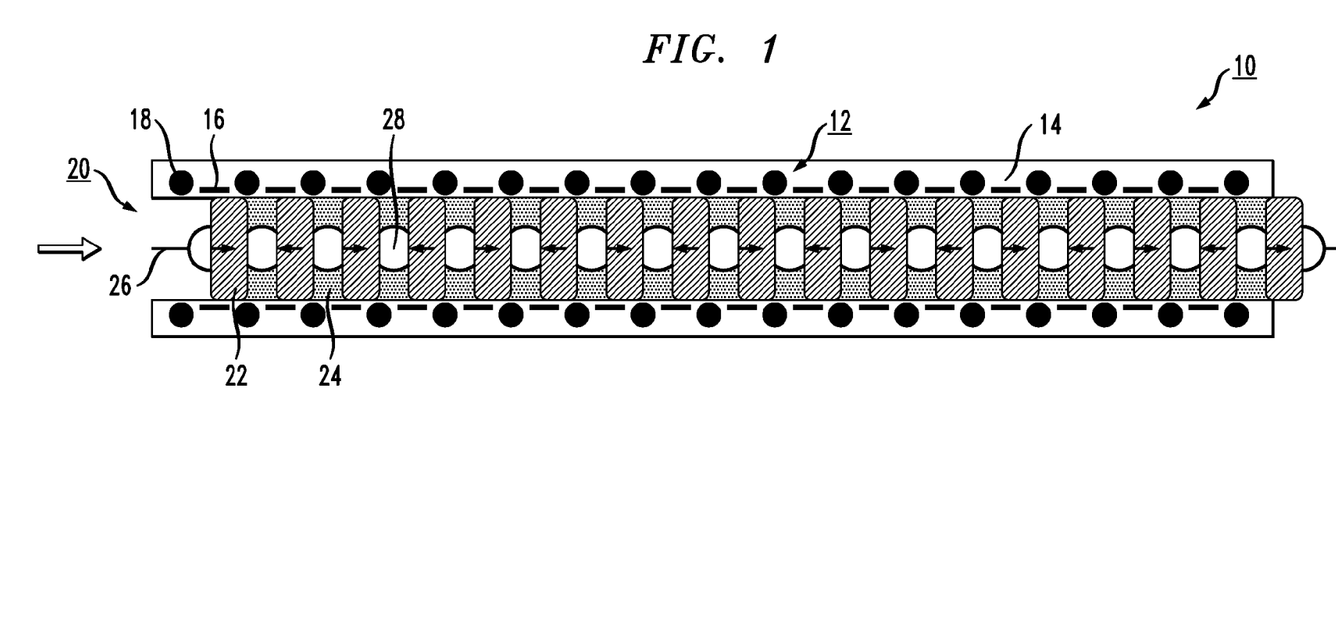
FIG. 1 illustrates a portion of an exemplary embodiment of an energy harvesting arrangement based upon a combination of an energy-producing channel and an energy-producing chain (included within the channel), where this arrangement may be disposed within a shoe and create electrical energy via human locomotion.

FIG. 1 illustrates a portion of an exemplary embodiment of an energy harvesting arrangement 10, which includes a flexible energy-producing channel 12 and a flexible energy-producing chain 20. Flexible energy-producing channel 12 is shown as including energy-producing elements 14, in this case a plurality of dielectric-coated electrodes 16 and a separate plurality of conductive coils 18. As shown, dielectric-coated electrodes 16 and conductive coils 18 are disposed in an alternating pattern along the length of energy-producing channel 12 (these elements may be embedded within the material forming channel 12, or disposed along an inner edge thereof).

Flexible energy-producing chain 20 comprises a plurality of magnetic elements 22 that are affixed to a flexible string 26, with neighboring magnetic elements separated by optional spacers 28. Neighboring magnetic elements are magnetized through their thickness in opposite directions (as indicated by the arrows on each magnetic element) and affixed to flexible string 26 in such a way that they cannot rotate around string 26 or slide therealong. Lastly, flexible energy-producing chain 20 also includes a plurality of energy-producing conductive droplets 24 that are disposed between neighboring magnetic elements 22.

As shown in FIG. 1, energy-producing chain 20 is positioned within energy-producing channel 12 in a manner where chain 20 is free to slide along within channel 12 (as indicated by the arrow in FIG. 1). Therefore, as magnetic elements 22 and conductive droplets 24 slide along within channel 12, they generate electrical current each time they align with conductive coils 18 and dielectric electrodes 16, respectively. The mechanism of electrical current generation in conductive coils 18 is based on the Faraday's law of electromagnetic induction and is well known to those skilled in the art. The mechanism of electrical current generation in dielectric-coated electrodes 16 is provided via a capacitive charge and discharge cycle, as fully described in incorporated-by-reference U.S. Pat. Nos. 7,898,096 and 8,053,914.

With this basic understanding of the energy harvesting process using a combination of an energy-producing chain and an energy-producing channel, the particulars of the present invention can be best understood.

Figure 2:
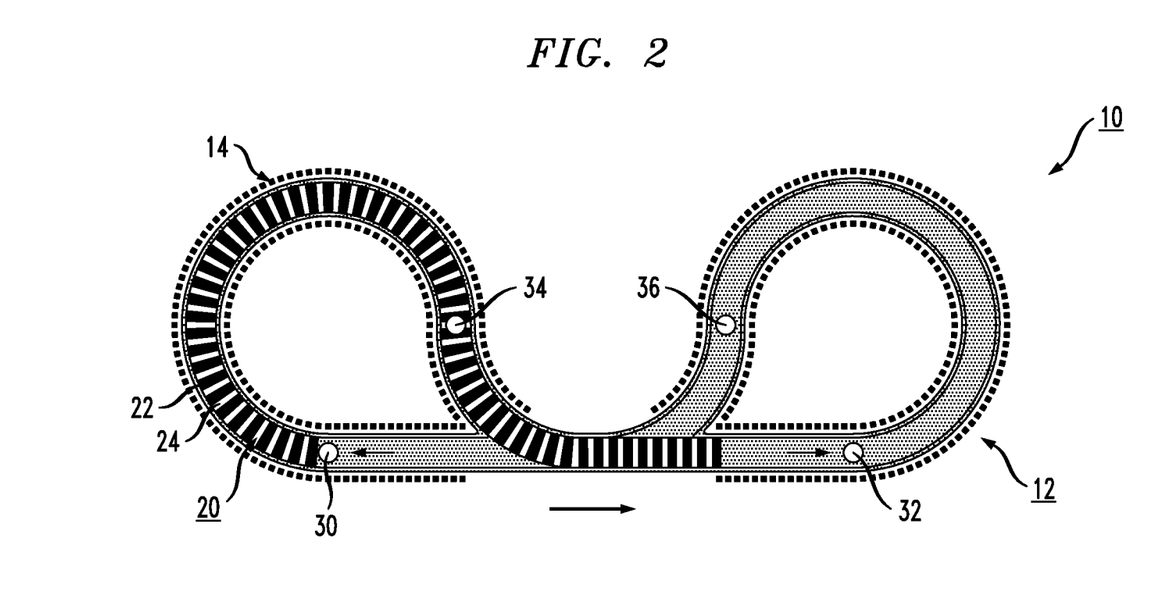
FIG. 2 presents a cut-away top view of one exemplary dual-loop embodiment of energy harvesting apparatus 10 formed in accordance with the present invention.

FIG. 2 presents a cut-away top view of one exemplary dual-loop embodiment of energy harvesting apparatus 10 formed in accordance with the present invention. As described above in association with FIG. 1, dual-loop apparatus 10 of FIG. 2 comprises three major subsystems: (i) a dual-loop flexible channel 12, (ii) a set of conductive energy-producing elements 14 (e.g., alternating dielectric-coated electrodes and conductive coils) surrounding at least some part of flexible channel 12, and (iii) a flexible chain 20 of magnetic chain elements 22 and energy-generating conductive droplets 24.

In accordance with the present invention, energy-producing chain 20 is adapted to freely slide along within dual-loop channel 12. In particular, the motion of energy-producing chain 20 is hydraulically activated, induced by the flow of a fluid entering channel 12 through inlet ports 30 and 32 and exiting channel 12 through outlet ports 34 and 36. All of these ports take the form of valves that maintain unidirectional flow of the hydraulic fluid within dual-loop channel 12. As described above in association with FIG. 1, the motion of chain 20 within channel 12 generates electrical current in the set of conductive electrodes and conductive coils forming elements 14.

Figure 3:
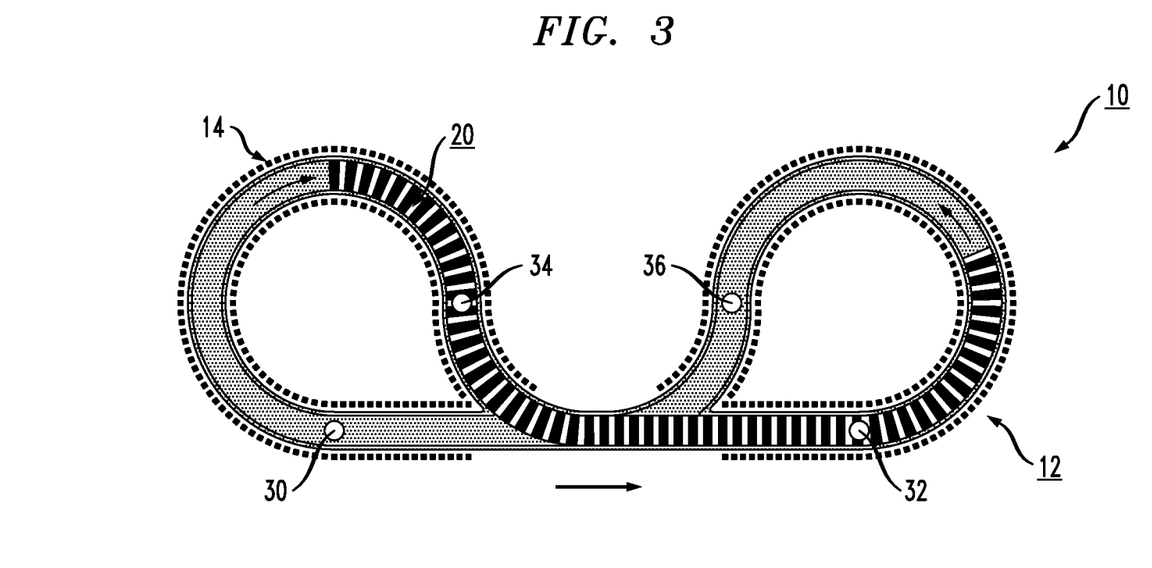
FIG. 3 shows the same top view of the exemplary dual-loop channel as shown in FIG. 2, in this case illustrating the movement of the chain within the dual-loop channel.
Figure 4:
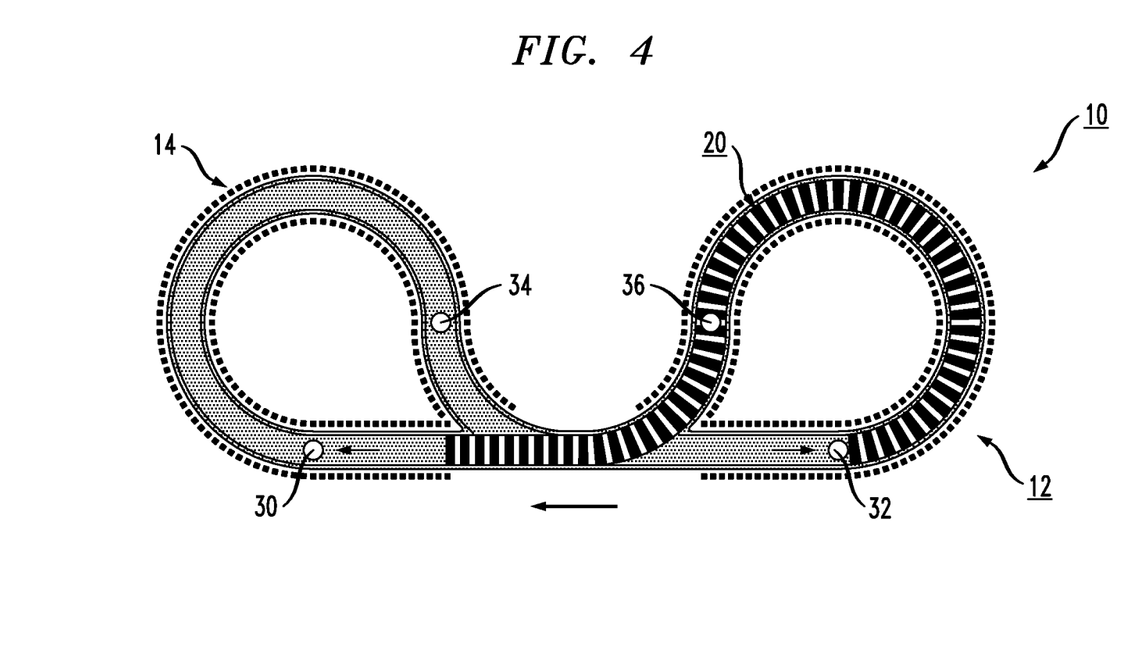
FIG. 4 also shows the same top view of the dual-loop channel, in this case illustrating the continuous, revolving movement of the chain within the dual-loop channel.

The motion of energy-producing chain 20 within dual-loop channel 12 is illustrated in FIGS. 2, 3 and 4, which show a full cycle of the revolving chain motion. In FIG. 2, the fluid enters channel 12 through inlet port 30 and creates a hydraulic force that propels chain 20 in the direction shown by the arrow. Under the influence of this force, chain 20 slides along channel 12 into a new position as shown in FIG. 3. Once in this position, the fluid entering channel 12 through inlet port 30 keeps pushing chain 20 around loop 12-R of channel 12 in the direction indicated by the arrow shown in FIG. 3.

Eventually, chain 20 is completely displaced from left loop 12-L and shifted into right loop 12-R of energy-producing, dual-loop channel 12, as shown in FIG. 4. At this point, chain 20 is propelled by the fluid entering channel 12 through entrance port 32. The introduction of the fluid through inlet port 32 causes chain 20 to continue to revolve within dual-loop channel 12, as indicated by the arrow in FIG. 4, where at this point chain 20 will once again begin to move along left-hand loop 12-L. The continuous, revolving motion of chain 20 between loops 12-L and 12-R continues in a similar fashion, as controlled by the fluid introduced into inlet ports 30 and 32.

Therefore, in accordance with the capabilities of harvesting electrical energy from the continuous, revolving motion of chain 20 within channel 12, the dual-loop configuration of the present invention is able to generate more energy from a smaller device than possible with the reciprocating motion-based arrangements of the prior art. While the embodiment as discussed above depicts an energy harvesting apparatus that utilizes both dielectric-coated electrodes and conductive coils in combination with magnetic elements and conductive droplets, it is to be understood that other embodiments may utilize an energy-producing combination of only dielectric-coated electrodes and conductive droplets, or only a combination of conductive coils with magnetic elements. In each case, these arrangements of an energy-producing chain moving within an energy-producing channel is useful in transforming mechanical energy (in the form of human locomotion, for example) into electrical energy.

Figure 5:
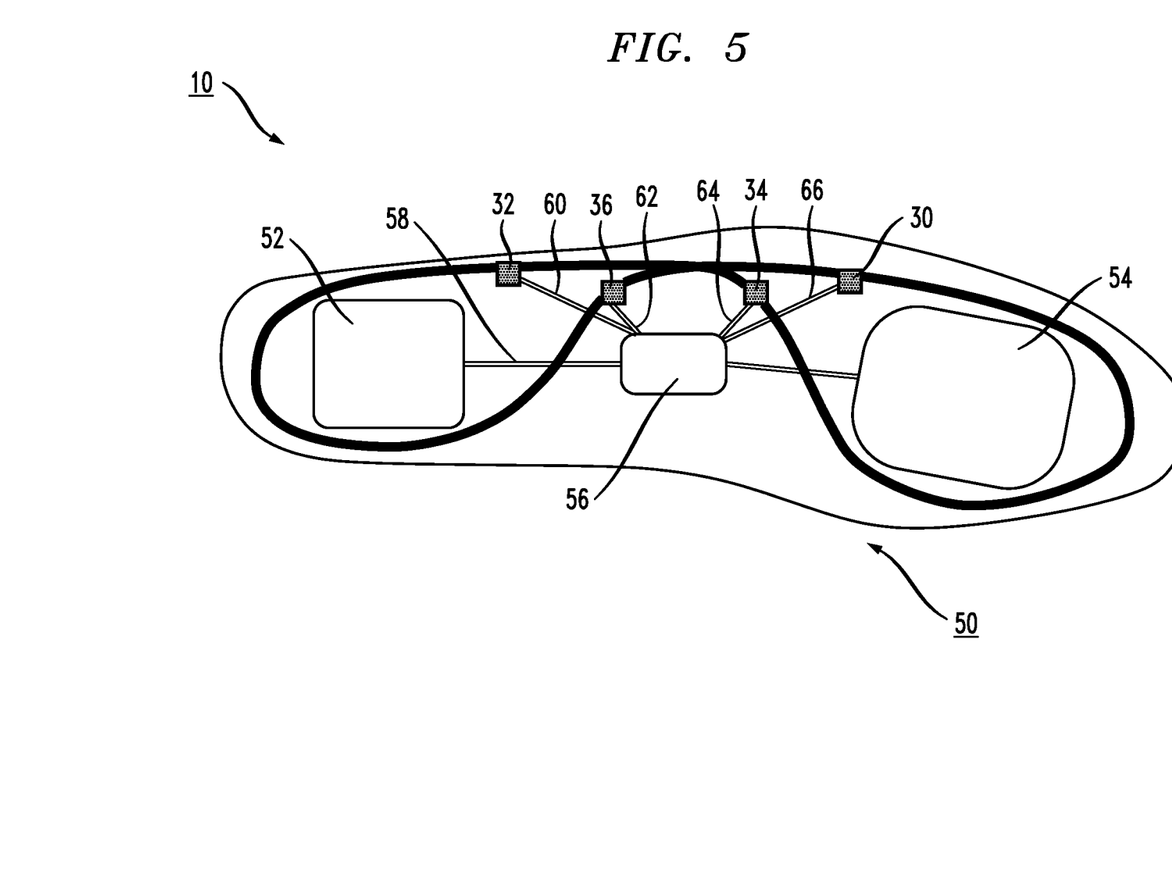
FIG. 5 schematically shows one exemplary embodiment of dual-loop apparatus for mechanical energy harvesting as embedded in a typical footwear midsole.

FIG. 5 schematically shows one exemplary embodiment of dual-loop apparatus 10 for mechanical energy harvesting as embedded in a typical footwear midsole 50. As described in detail above, apparatus 10 comprises energy-producing dual-loop channel 12 (shown as a solid black form in FIG. 5, with the understanding that an energy-producing chain—not shown—is revolving in continuous motion within channel 12). Two flexible chambers 52 and 54 are included within midsole 50, where chambers 52 and 54 are filled with the inert liquid used to create the fluid motion of chain 20 within channel 12. Any suitable type of hydraulic fluid (i.e., a silicone material) may be used within chambers 52 and 54 to control the movement of energy-producing chain 20. In this example, flexible chamber 52 is located at the heel area of midsole 50 and flexible chamber 54 is located at the toe area of midsole 50. Chambers 52 and 54 are connected to a set of check valves 56 through connecting channels 58. Check valves 56 are designed to control a unidirectional flow around energy-producing channel 12 via channels 60, 62, 64 and 66, as shown, where channel 60 is coupled between check valves 56 and inlet port 32, channel 62 is coupled between check valves 56 and outlet port 36, channel 64 is coupled between check valves 56 and outlet port 34, and channel 66 is coupled between check valves 56 and inlet port 30.

During a heel strike, flexible chamber 52 is compressed and some of the fluid from the chamber is displaced through connecting channel 58 and check valves 56 into channel 12 via channel 66 and inlet port 30. Similarly, during toe-off, chamber 54 is compressed and some of the fluid from chamber 54 is ultimately displaced into channel 12. In both cases, the resulting flow causes revolving motion of the energy-producing chain inside the energy-producing channel 12 between left-hand loop 12-L and right-hand loop 12-R of dual-loop channel 12.

While various arrangements may be used to form check valves 56, it is possible to configure a magnetically-actuated valve that takes advantage of the inclusion of magnetic elements within the energy-producing chain. FIGS. 6-13 illustrate the details of one exemplary magnetically-actuated dual-loop energy harvesting apparatus formed in accordance with this aspect of the present invention.

Figure 6:
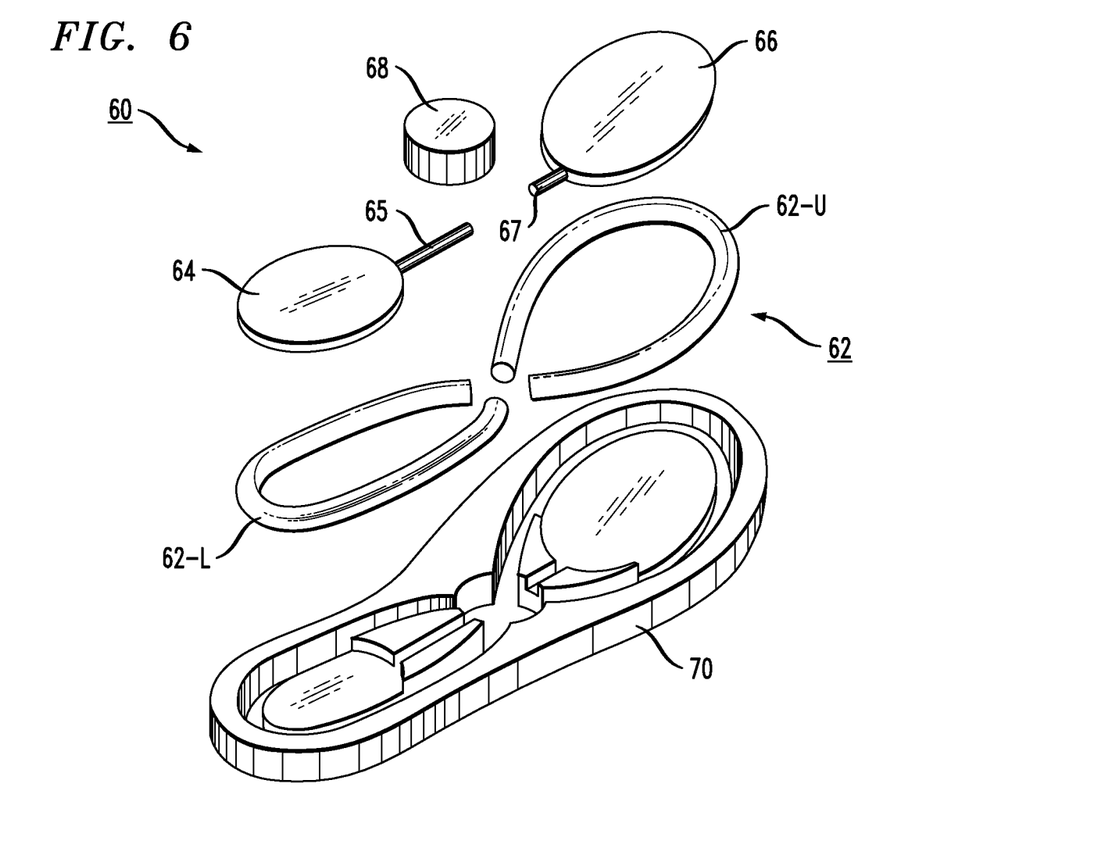
FIG. 6 is an exploded view of a dual-loop energy harvesting apparatus that utilizes a magnetically-actuated valve to control the revolving motion of an energy-producing chain within an energy-producing channel.

FIG. 6 is an exploded view of a dual-loop energy harvesting apparatus 60 that utilizes a magnetically-actuated valve to control the revolving motion of an energy-producing chain within an energy-producing channel. In particular, energy harvesting apparatus 60 comprises a dual-loop energy-producing channel 62, in this case defined as comprising a lower loop 62-L and an upper loop 62-U. Although not particularly illustrated, it is to be understood that channel 62 includes energy-producing elements (such as dielectric-coated electrodes and/or conductive coils). Additionally, in order to form an energy harvesting apparatus, an energy-producing chain (including elements such as magnets and conductive droplets) is disposed within channel 62 and slide therealong via human locomotion.

Returning to the description of FIG. 6, apparatus 60 further comprises flexible, fluid-filled chambers, in this case in the form of a heel chamber 64 and a toe chamber 66. In order to provide movement of the energy-producing chain with respect to the energy-producing channel, both chambers contain an appropriate inert liquid, such as a silicone material, that functions to create hydraulic actuation of the chain. A magnetically-actuated valve 68 is disposed between heel chamber 64 and toe chamber 66, with a first connecting channel 65 coupling heel chamber 64 to valve 68 and a second connecting channel 67 coupling toe chamber 66 to valve 68. All of these elements forming apparatus 60 are disposed within a flexible midsole insert 70.

Figure 7:
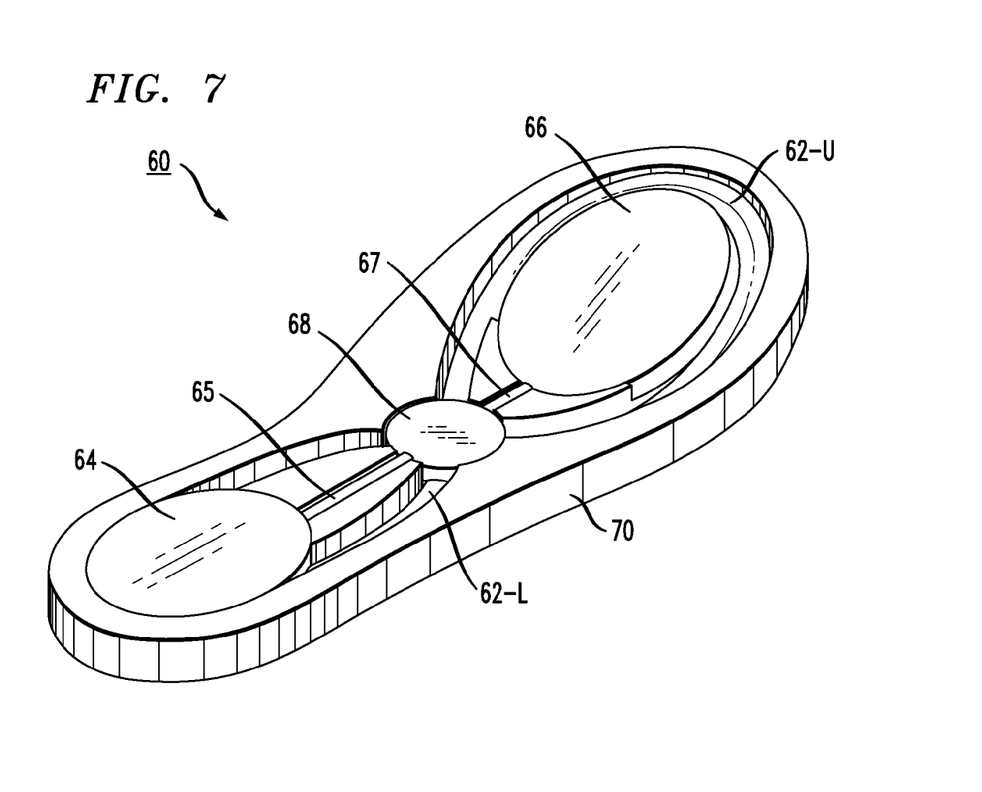
FIG. 7 is an isometric view of the arrangement of FIG. 6, illustrating the various components as positioned within a midsole insert.

FIG. 7 is an isometric view of apparatus 60, illustrating the various components as positioned within midsole insert 70. As shown, heel chamber 64 is disposed to essentially cover a portion of lower loop 62-L of channel 62, where channel 62 raises in position as it nears magnetically-actuated valve 68. Indeed, channel 62 continues to elevate its position with respect to midsole insert 70 until the midpoint of upper loop 62-U is reached.

Figure 8:
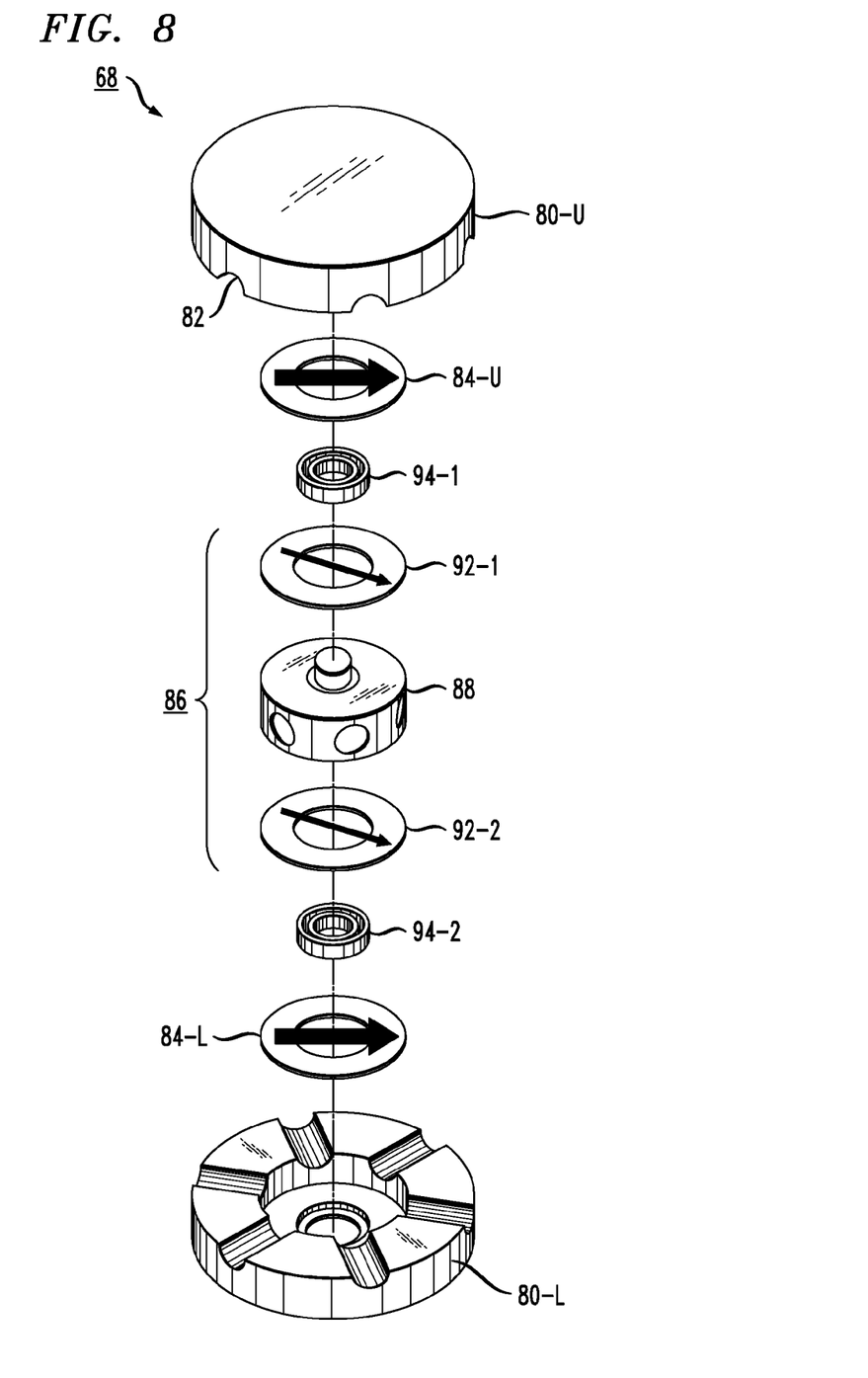
FIG. 8 is an exploded view of an exemplary magnetically-actuated valve that may be used in an energy-harvesting apparatus formed in accordance with the present invention.

As will be explained in detail below, an initial section of an energy-producing chain is formed in this particular embodiment to include a magnetic component that will pass through magnetically-actuated valve 68 and functions to switch valve 68 between two predetermined positions in a manner such that the chain will continuously revolve within channel 62. FIG. 8 is an exploded view of an exemplary magnetically-actuated valve 68 that may be used for this purpose.

Figure 9:
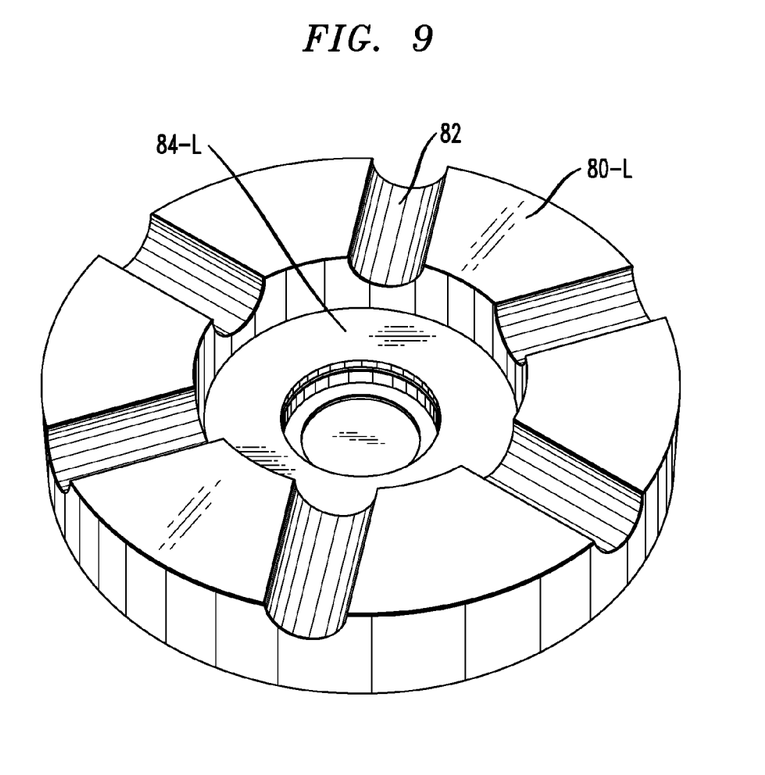
FIG. 9 is a detailed view of a lower half of the valve housing as shown in FIG. 8, showing the position of U-shaped grooves around the circumference of the housing, as well as the disposition of the magnetic ring within the housing.

Referring to FIG. 8, magnetically-actuated valve 68 is seen to comprise a housing 80 that is formed to include an upper half 80-U and a lower half 80-L. As best seen with lower half 80-L, a plurality of U-shaped grooves 82 are formed in housing 80 that are used to allow for the inert fluid and energy-producing chain to pass through valve 68. Each portion of housing 80 also includes a magnetic ring 84 (shown as rings 84-U and 84-L in FIG. 8), providing a defined, permanent magnetization of housing 80. FIG. 9 is a detailed view of lower half 80-L of housing 80, showing the position of U-shaped grooves 82 around the circumference of lower housing 80-L, as well as the disposition of magnetic ring 84-L within housing 80-L.

Returning to the description of FIG. 8, magnetically-actuated valve 68 is shown as also comprising a rotor assembly 86 that switches between two positions (as controlled by the passage of the initial magnetic component of the energy-producing chain) to maintain the revolving motion of the energy-producing chain within the energy-producing channel. In particular, rotor assembly 86 comprises a rotor element 88 including a plurality of ports 90, with a pair of rotor magnetic rings 92-1 and 92-2 disposed on opposing surfaces of rotor element 88, as shown. Rotor magnetic rings 92 are positioned such that their magnetic fields align with one another.

Figure 10:
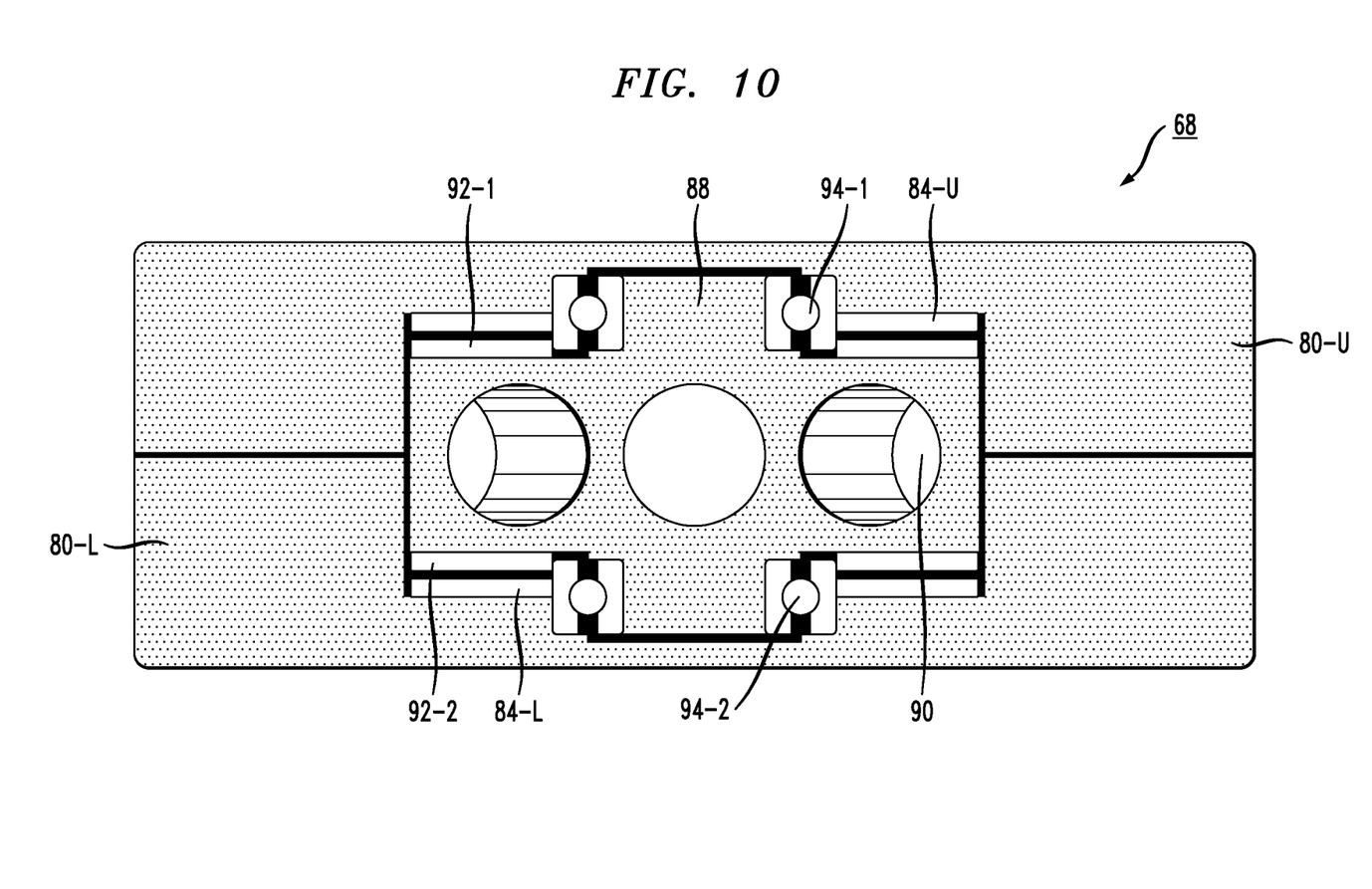
FIG. 10 is a cut-away side view of the magnetically-actuated valve as shown in FIG. 8.

To complete the assembly of valve 68, a pair of bearings 94-1 and 94-2 is used to enclose rotor assembly 86 within housing 80 in a manner such that rotor assembly 84 is free to rotate within housing 80. FIG. 10 is a cut-away side view of magnetically-actuated valve 68, showing the particular location of each component as described above in association with FIG. 8. In this view, it is clear that when upper housing 80-U is mated with lower housing 80-L, rotor assembly 86 will be completely encased. In accordance with the present invention, the movement of a magnetic component through the interior of rotor element 88 (i.e., through ports 90) will displace rotor magnetic rings 92 with respect to housing magnetic rings 84, switching the coupling between ports 90 and grooves 82 in a manner described below.

Figure 11:
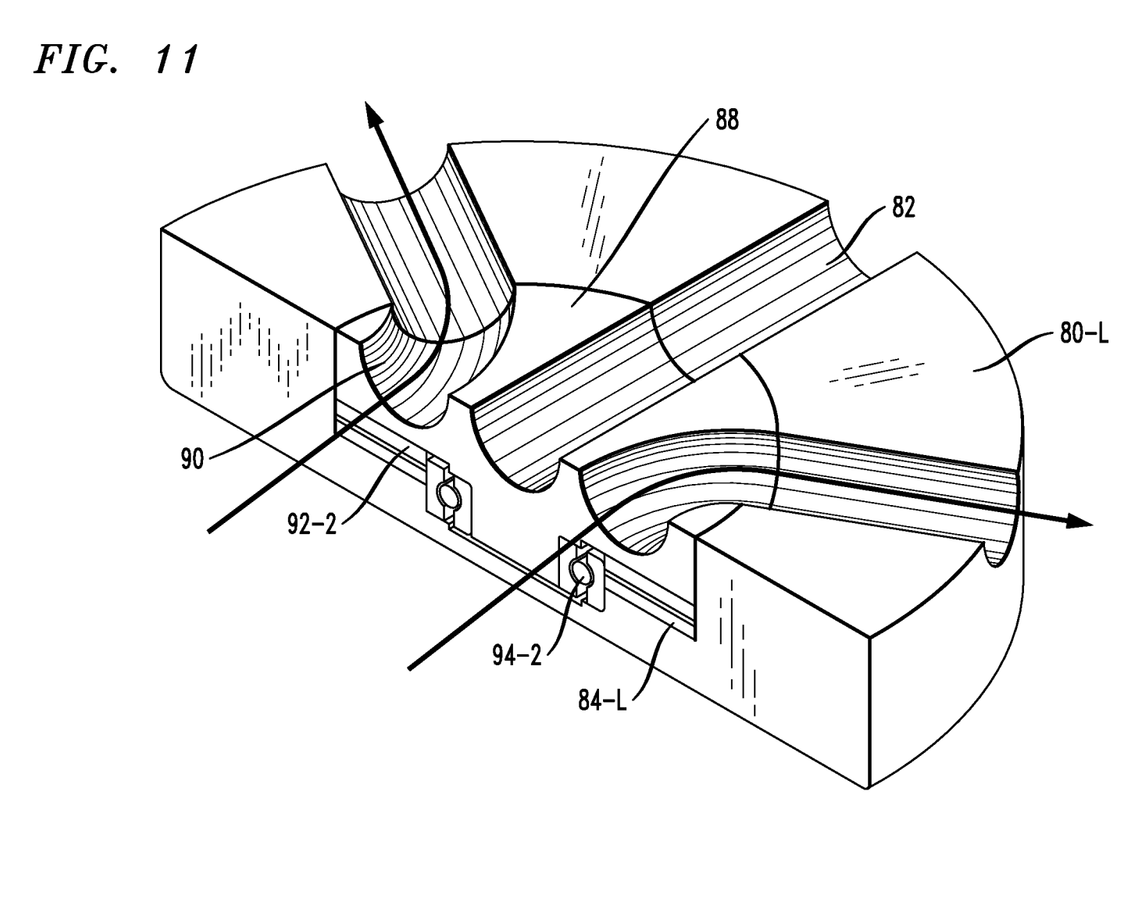
FIG. 11 is a cut-away isometric view of a lower portion of the magnetically-activated valve of FIG. 8.

FIG. 11 is a cut-away isometric view of a lower portion of magnetically-actuated valve 68, illustrating the placement of rotor element within a central depression of lower housing 80-L. Portions of housing magnetic ring 84-L and rotor magnetic ring 92-2 are also shown in this view, as well as bearings 94-1 and 94-2. Particularly evident in this view is the alignment created between ports 90 of rotor element 88 with selected U-shaped grooves 82 of lower housing 80-L for one "state" of magnetically-activated valve 68. FIG. 11 includes arrows showing the direction of "flow" (and chain revolving motion) within magnetically-actuated valve 68.

Figure 12A:
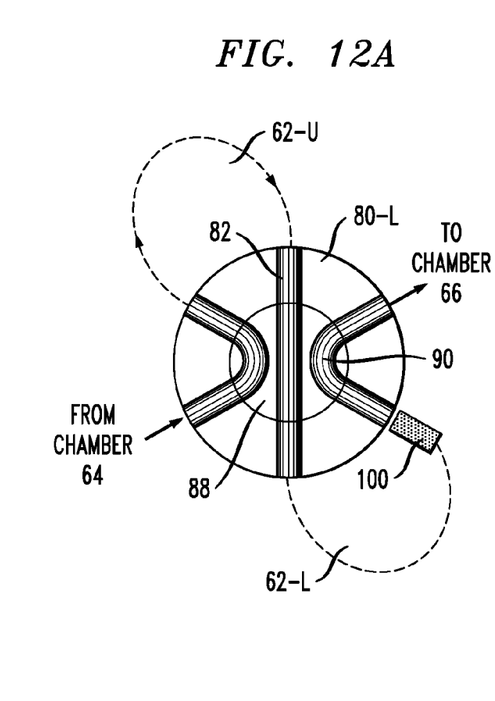
FIGS. 12A-12C illustrate the magnet-controlled movement of a rotor assembly within a valve housing between a pair of positions that control the movement of fluid and the energy-producing chain in accordance with the present invention.
Figure 12B:
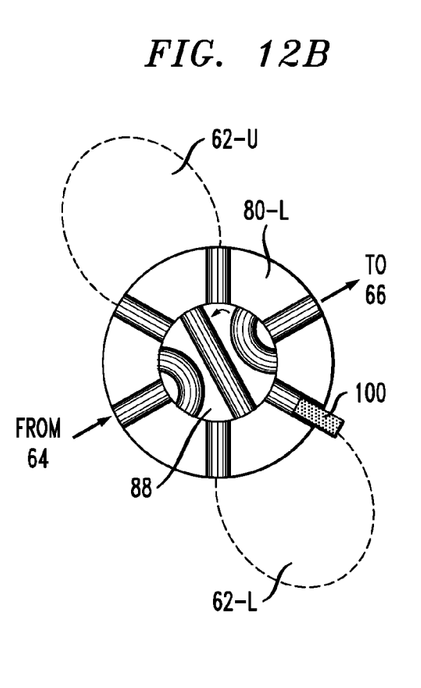
Figure 12C:
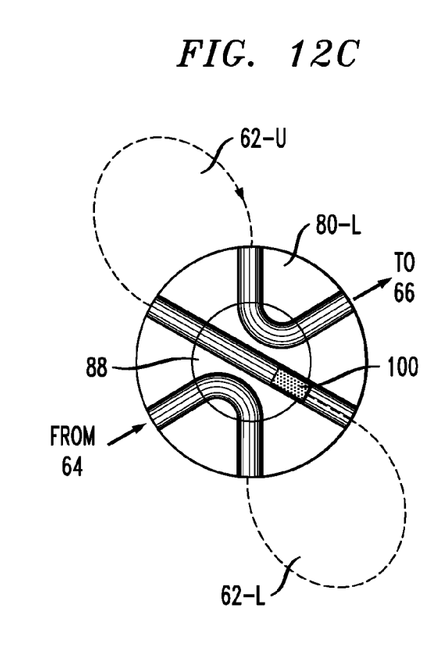

FIGS. 12A-12C illustrate the movement of rotor assembly 86 with respect to housing 80, in this case a top view illustrating the relative positionings between lower housing 80-L (and grooves 82) and rotor element 88 (and ports 90). The arrows including on FIGS. 12A-12C illustrate the relative position of housing magnetic rings 84 and rotor magnetic rings 92. Upper loop 62-U and lower loop 62-L of channel 62 are indicated by the dotted lines in FIGS. 12A-12C.

In FIG. 12A, rotor element 88 is oriented such that the flow of fluid from heel chamber 64 (as shown in FIG. 6) will be directed through upper loop 62-U, then pass through valve 68 and enter lower loop 62-L. In this case, an energy-producing chain include an initial magnetic component 100 is entering valve 68 at the termination of lower loop 62-L. This may be defined as "state 1" of magnetically-activated valve 68.

As magnetic component 100 passes between fixed magnetic rings 84 of housing 80 and rotatable magnetic rings 92 of rotor assembly 86, rotor assembly 86 will rotate in an attempt to overcome the repulsive force introduced by magnetic component 100. FIG. 12B illustrates the beginning of such a rotation, where rotor element 86 is beginning to rotate counterclockwise with respect to housing 80 as magnetic component 100 comes under the influence of the magnetic rings.

By virtue of including physical "stops" in the design of the housing and the rotor, the amount of rotation permitted by rotor element 92 is limited. FIG. 12C illustrates the termination of this rotation, where now the energy-producing chain (indicated by magnetic portion 100) passes into upper loop 62-U and circulates through this loop. This positioning may be defined as "state 2" of magnetically-activated valve 68. Although not shown in detail, it is clear that this magnetically-actuated switching continues between states 1 and 2, with the orientation of rotor element 92 returning to that shown in FIG. 12A as magnetic portion exits upper loop 62-U.

Figure 13:
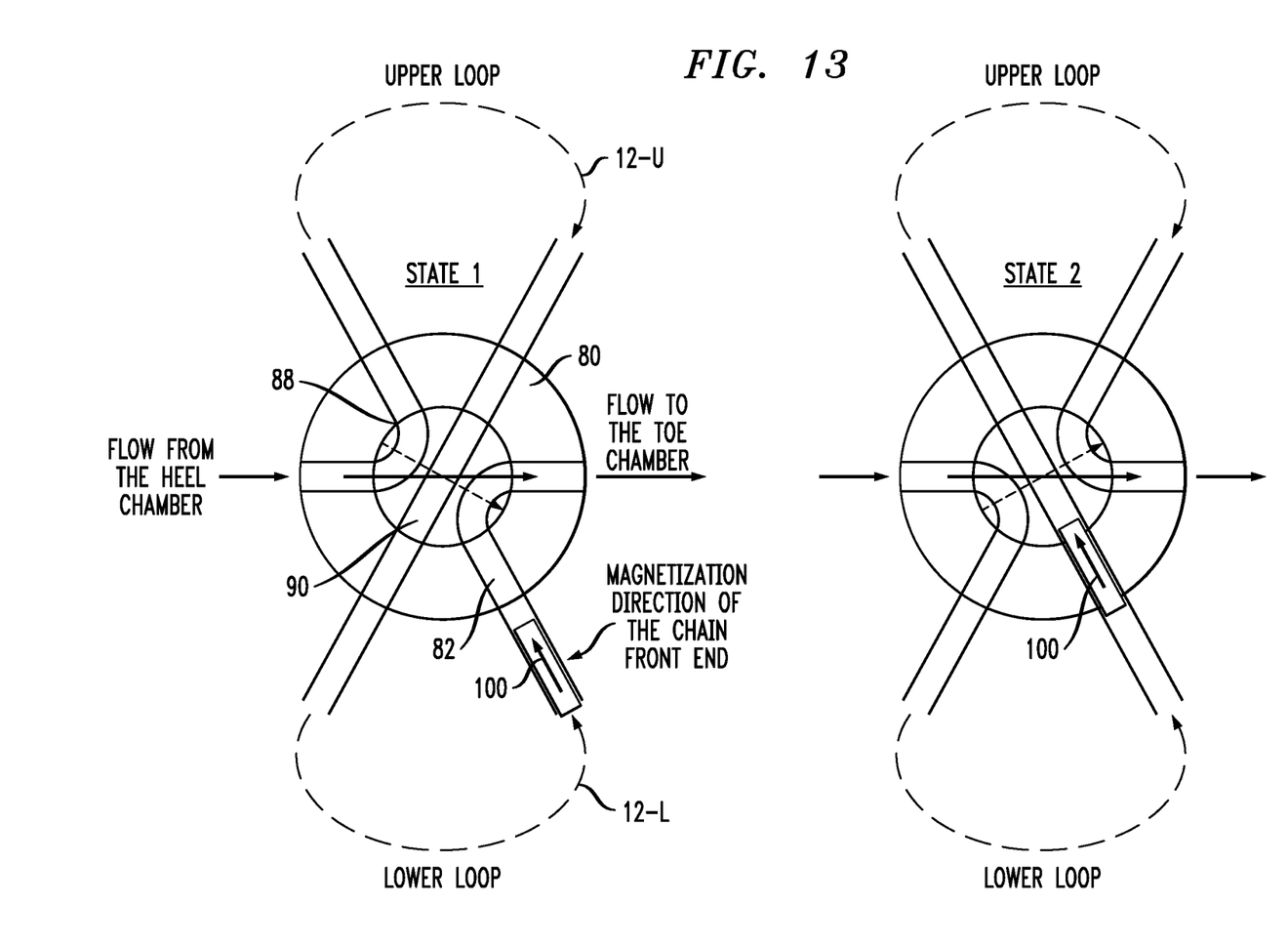
FIG. 13 contains a pair of diagrams illustrating the relative positions of the valve housing grooves and rotor element ports for both states of the valve.

FIG. 13 is a diagram that illustrates the two positions of magnetically-actuated valve 68 that have been defined as "state 1" and "state 2". Channel 12, in particular upper loop 12-U and lower loop 12-L are shown in phantom in FIG. 13 for the sake of simplicity. Referring to the "state 1" diagram of FIG. 13, magnetic component 100 of chain 20 is shown as entering magnetically-actuated valve 68 in the condition where the fluid is flowing from heel chamber 64 through upper loop 12-U, then passing through valve 68 and introduced into lower loop 12-L (and then flowing to toe chamber 66). The passage of magnetic component 100 through valve 68 functions to rotate rotor assembly 86 with respect to housing 80, creating the "state 2" orientation as shown. When in this state, the flow from heel chamber 64 is directed into lower loop 12-L, through valve 68 and then through upper loop 12-U (and ultimately into toe chamber 66).

Summarizing the principles of a magnetically-actuated, dual-loop energy harvesting arrangement of the present invention, the movement of the energy-producing chain within the energy-producing channel is hydraulically activated by the movement of an inert fluid between two flexible chambers (such as a "heel" chamber and a "toe" chamber located in a midsole insert for a shoe). The valve switches the fluid supply so that the energy-producing chain will continue its revolving motion between the two loops of the dual-loop channel (as long as the fluid flow is supported). The valve is configured as a bi-stable device (i.e., "state 1" and "state 2"). The bi-stability is achieved by the repulsive interaction of the rotor magnetic rings and the housing magnetic rings, which attempt to achieve maximum misalignment of their permanent magnetic fields. The rotation of the rotor beyond the angles that correspond to states 1 and 2 may be prevented by any suitable mechanism (for example, a standard mechanical pin and slot lock).

As the initial magnetic component of the chain completes the lower loop and approaches the valve from below, the magnetic repulsive force causes the rotor magnetic rings to rotate the rotor element in a counter-clockwise direction (for example), overcoming the repulsion from the housing magnetic rings. Thus cases the valve to switch from state 1 to state 2, allowing unimpeded motion of the chain through the valve into the upper loop of the channel. Upon completion of its revolution around the upper loop, the chain will re-enter the valve, and the magnetic component at the front of the chain will actuate the valve to allow for the rotor to move back to its state 1 position.

Although only several preferred embodiments of the present invention has been described in detail here, those of ordinary skill in the art should understand that they could make various changes, substitutions and alterations herein without departing from the scope of the invention. In particular, only one exemplary embodiment of the expanding assembly of chain elements is discussed in detail here. However, those of ordinary skill in the art should understand that other embodiments of expanding assemblies of elements based on elastic polymeric materials, mechanical springs, etc. can be advantageously utilized without departing from the scope of the current invention.

What is claimed is:

1. An apparatus for converting mechanical energy into electrical energy utilizing an energy-producing chain passing within an energy-producing channel, the apparatus comprising
   a dual-loop channel formed as a tube, each loop including an inlet port and an outlet port for allowing the passage of an inert fluid therethrough;
   a plurality of energy-producing elements surrounding at least a portion of the dual-loop channel;
   a chain of energy-producing elements disposed within the dual-loop channel, the chain comprising a flexible string with the energy-producing elements disposed thereal­ong and affixed thereto such that the energy-producing elements cannot rotate around the flexible string or slide along the flexible string;
   a pair of flexible chambers, each flexible chamber contain­ing a portion of the inert fluid and coupled between the inlet port and the outlet port of each loop of the dual-loop channel, the movement of the inert fluid between the pair of flexible chambers via the dual-loop channel being hydraulically activated in a controlled manner such that the chain of energy-producing elements moves in a con­tinuous, revolving motion along the dual-loop chain in response to a mechanical compression of a flexible chamber; and
   a check valve configuration disposed between the pair of flexible chambers and coupled to the inlet and outlet ports of the dual-loop channel to create unidirectional flow of the inert fluid in a continuous manner between the pair of flexible chambers and the dual-loop channel so as to create electrical energy in a continuous manner.

2. An apparatus as defined in claim 1 wherein the chain includes an initial magnetic component coupled to a front end of the flexible string, and the check valve configuration com­prises a magnetically-actuated valve.

3. An apparatus as defined in claim 2 wherein the magneti­cally-actuated valve comprises
   a housing exhibiting a permanent magnetic orientation and including a plurality of grooves for supporting the move­ment of the inert fluid and the energy-producing chain; and
   a rotor assembly disposed within the housing, the rotor assembly exhibiting a permanent magnetic orientation different from the housing magnetic orientation and including a plurality of ports for supporting the move­ment of the inert fluid and the energy-producing chain, wherein the passage of the chain magnetic component through the combination of the grooves and ports causes a rotation of the rotor assembly with respect to the hous­ing by magnetic repulsion, switching between two pre­defined positions of the rotor assembly with respect to the housing and controlling the movement of the inert fluid and energy-producing chain through the valve.

4. An apparatus as defined in claim 3 wherein the housing comprises an upper half housing and a lower half housing, with the rotor assembly disposed therebetween, and a bearing included between each half housing and the rotor assembly.

5. An apparatus as defined in claim 1 wherein the inert fluid comprises a silicone material.

6. An apparatus as defined in claim 1 wherein the plurality of energy-producing elements surrounding at least a portion of the dual-loop channel comprises a plurality of dielectric­coated electrodes disposed along at least a portion of the dual-loop channel and the plurality of energy-producing ele­ments forming the chain comprises a plurality of conductive droplets held in a spaced-apart configuration along the flex­ible string.

7. An apparatus as defined in claim 1 wherein the plurality of energy-producing elements surrounding at least a portion of the dual-loop channel comprises a plurality of conductive coils disposed along at least a portion of the dual-loop channel and the plurality of energy-producing elements forming the chain comprises a plurality of magnetic elements held in a spaced-apart configuration along the flexible string, with adjacent magnetic elements of opposite polarity.

8. An apparatus as defined in claim 1 wherein the plurality of energy-producing elements surrounding at least a portion of the dual-loop channel comprises a plurality of dielectric­coated electrodes and a plurality of conductive coils, disposed in an alternating pattern along at least a portion of the dual­loop channel, and the plurality of energy-producing elements forming the chain comprises a plurality of conductive drop­lets and a plurality of magnetic elements disposed in an alter­nating pattern along the flexible string.

* * * * *